United States Patent [19]

Vermeulen

[11] 3,924,243

[45] Dec. 2, 1975

[54] CROSS-FIELD-PARTITIONING IN ARRAY LOGIC MODULES

[75] Inventor: Johannes C. Vermeulen, Longmont, Colo.

[73] Assignee: International Business Machines Corporation, Armonk, N.Y.

[22] Filed: Aug. 6, 1974

[21] Appl. No.: 495,165

[52] U.S. Cl. .......................... 340/172.5; 340/173 AM
[51] Int. Cl.$^2$ .......................... G11C 15/00
[58] Field of Search .................. 340/172.5, 173 AM

[56] References Cited

UNITED STATES PATENTS

| | | | |
|---|---|---|---|
| 3,593,317 | 7/1971 | Fleisher et al. | 340/172.5 |
| 3,681,762 | 8/1972 | Minshull et al. | 340/172.5 |
| 3,742,460 | 6/1973 | Englund | 340/172.5 |
| 3,761,902 | 9/1973 | Weinberger | 340/713 AM X |

OTHER PUBLICATIONS

Kent Andres, "MDS Programmable Logic Arrays," A Texas Instruments application report, number CA-158, Oct. 1970, pp. 1-13.

J. E. Elliott et al., "Array Logic Processing," *IBM Technical Disclosure Bulletin*, Vol. 16, No. 2, July 1973, pp. 586-587.

J. W. Jones, "Triple-Bit Coding," *IBM Technical Disclosure Bulletin*, Vol. 15, No. 2, July 1972, pp. 460-461.

*Primary Examiner*—Charles E. Atkinson
*Assistant Examiner*—Jerry Smith
*Attorney, Agent, or Firm*—Herbert F. Somermeyer

[57] ABSTRACT

Efficiency of an associative store using bit-partitioning is enhanced by partitioning input signals with feedback signals.

6 Claims, 9 Drawing Figures

CROSS-FIELD-PARTITIONING IN ARRAY LOGIC MODULES

DOCUMENTS INCORPORATED BY REFERENCE

Peter L. Gardner, "Functional Memory and Its Microprogramming Implications," IEEE TRANSACTIONS ON COMPUTERS, Volume C-20, No. 7, July 1971, pages 764–775.

M. Flinders et al., "Functional Memory as a General Purpose Systems Technology," PROCEEDINGS, IEEE COMPUTER GROUP CONFERENCE, June 1970, pages 314–324.

Fleisher et al. U.S. Pat. No. 3,593,317 shows a partitioned logic array; the present invention is an improvement over this patent.

Weinberger U.S. Pat. No. 3,761,902 shows a partitioned logic array using four-stage array cells.

Minshull et al. U.S. Pat. No. 3,681,762 shows an auto-sequencing associative store preferably to be employed with the present invention.

Gardner et al. U.S. Pat. No. 3,585,605 shows a simple data processing system using associative stores and in which the present invention may be practiced to advantage.

U.S. Pat. No. 3,609,702 shows an associative store.

BACKGROUND OF THE INVENTION

This invention relates to associative stores, particularly to function-performing associative stores.

An associative store is an array of logic and storage elements in a plurality of word registers (also termed words) arranged such that each word register is selected based upon the stored signal content in a search field within the words. Selection of a word in an associative store results in an operation which is called search. The input signal to the search array is compared with the content of a selected field of all words. Those words having a search field content matching the contents of an input field content activate their respective read fields over row output lines. Such row output lines are connected to corresponding row input lines of a so-called read array consisting of read fields of each word and constructed to selectively connect signals from the row input lines to a set of columnar output lines. The read field is alsoo called an OR field, in that any input on a row input line connected to a given columnar output line provides an active output signal.

Associative stores and other forms of array logic which contain function tables on which table lookup or associative operations are performed provide a practical approach to many data processing system designs. Many functions can be performed within one array. With the advent of large-scale integration of semiconductive circuits, array logic has taken on a new dimension of importance.

Even with the efficiencies provided by large-scale integration (LSI), there has been a continuing effort to reduce the number of words required to perform a given function. To this end, the above referenced Fleisher et al patent teaches that partitioning the logic from binary signals to higher ordered information lines (Base 4, Base 16, and so forth), the data processing power of a given associative store can be enhanced. While Fleisher et al provide substantial improvements over associative stores prior to their invention, it is still desired to provide more function per word than even provided by Fleisher et al.

A simple data processing system employing associative stores in described by Gardner et al in U.S. Pat. No. 3,585,605.

SUMMARY OF THE INVENTION

According to the present invention, data processing power of an associative store is enhanced by partitioning a search array between binary input signals and binary feedback signals from a read array. Such partitioning is termed cross-field partitioning.

In other aspects of the invention, such cross-field partitioning is combined with other partitioning combinations in accordance with the functions to be performed for minimizing the number of words in an associated array. In accordance with the invention, the total number of circuits required to perform a given function is reduced by adding a few logic circuits at an input portion of a search array and reducing the number of words within the associative array.

The foregoing and other objects, features, and advantages of the invention will be apparent from the following more particular description of preferred embodiments of the invention, as illustrated in the accompanying drawings.

THE DRAWING

Figure 3:
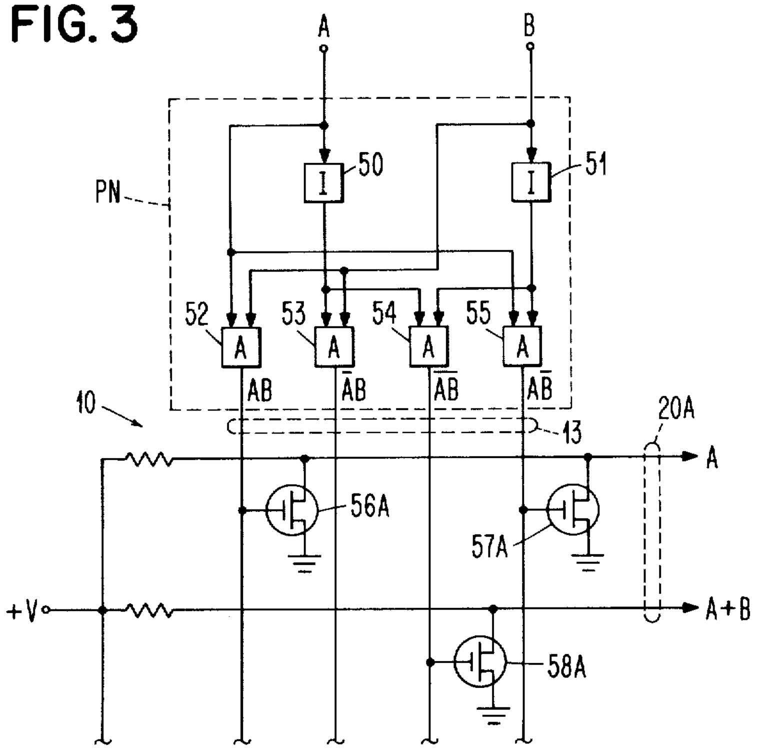

FIG. 3 diagrammatically illustrates partitioning a search array.

Figure 4:
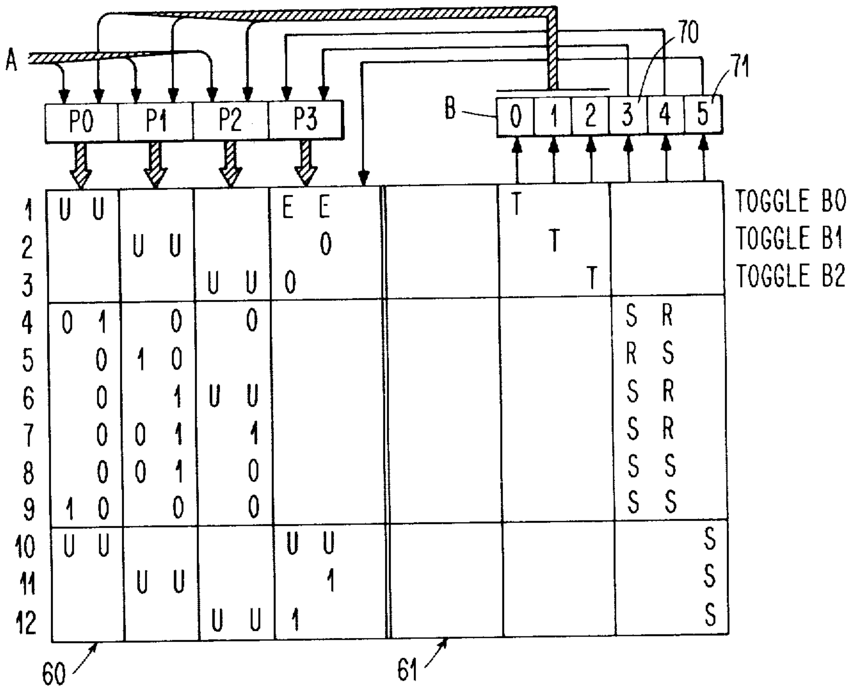

FIG. 4 is a diagrammatic showing of an associative store employing the invention for performing some simple logic functions.

Figure 5:
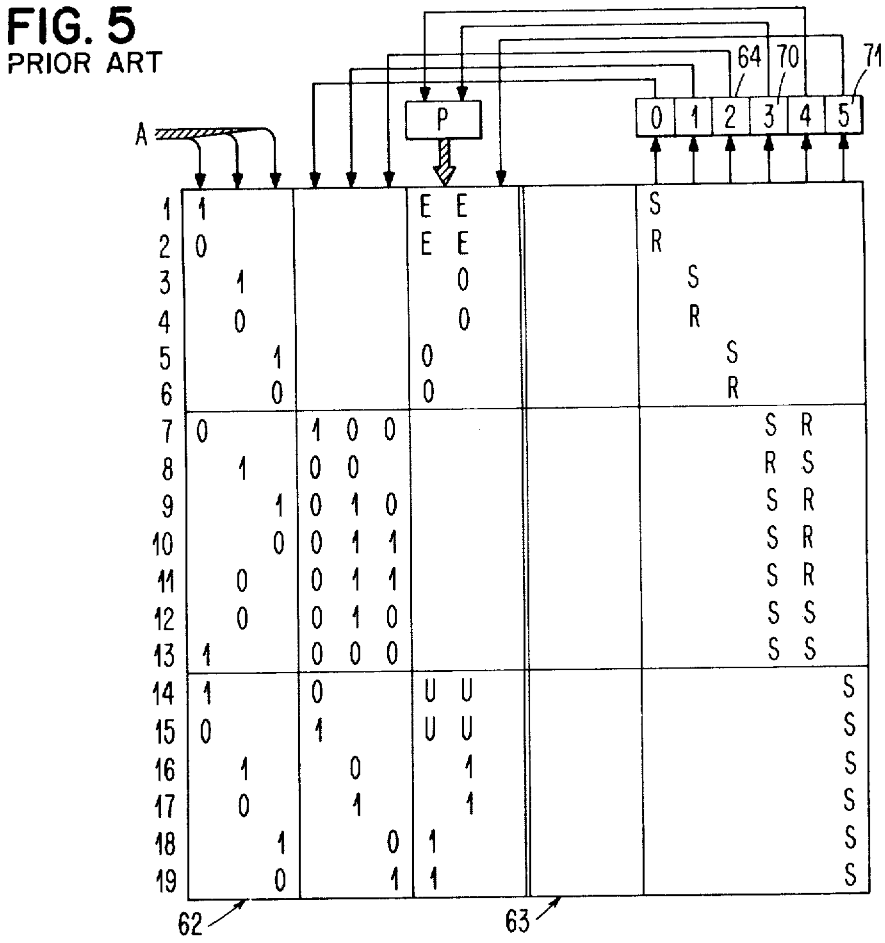
FIG. 5 PRIOR ART

FIG. 5 is a drawing corresponding to FIG. 4 constructed using prior art techniques.

Figure 6:
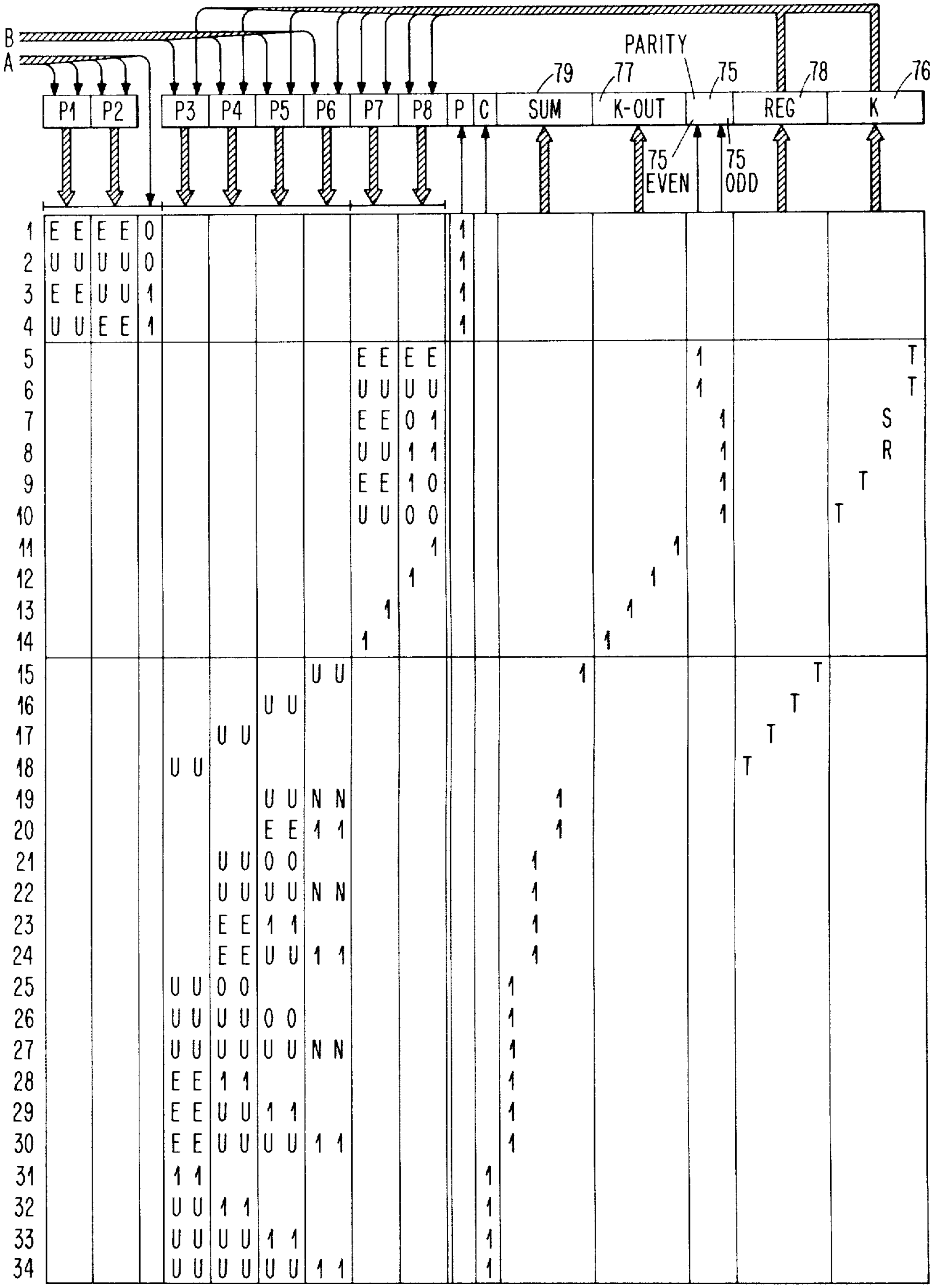

FIG. 6 is a diagrammatic showing of an associative store employing the present invention to good advantage and combining cross-field partitioning with other forms of partitioning for enhancing functional capabilities of the illustrated associative store.

DETAILED DESCRIPTION

Figure 1:
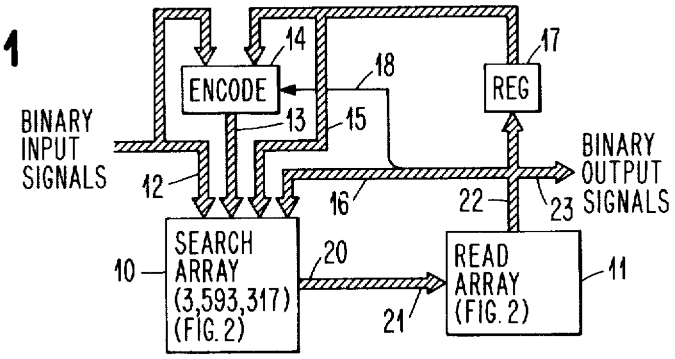
FIG. 1 is simplified block diagram of an associative store employing the present invention.
Figures 2A, 2B, 2C, 2D:
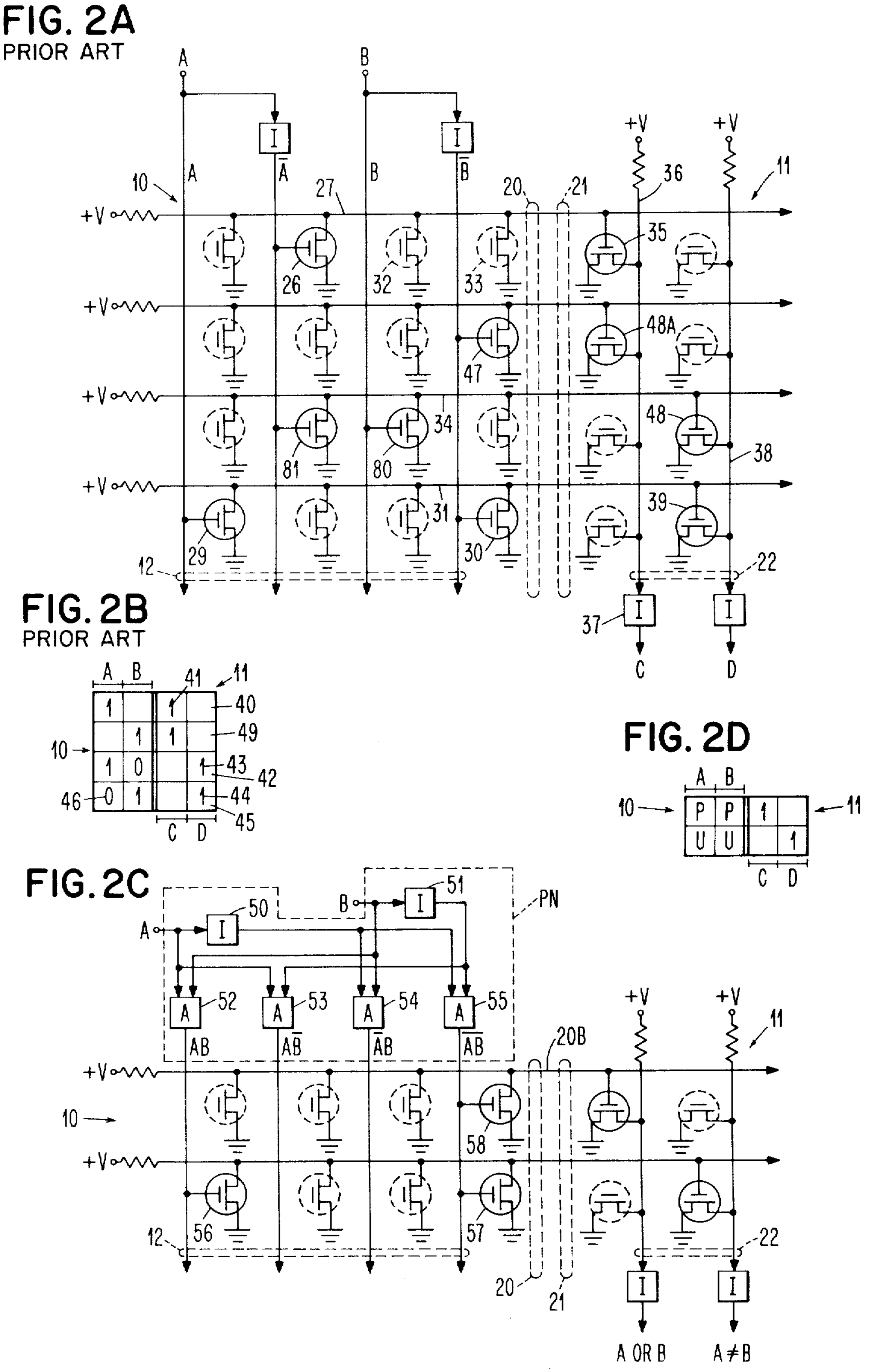
FIG. 2A is an abbreviated circuit diagram of an associative store showing the circuit details of a prior art associative store.
FIG. 2B is a legend illustrating representation of the FIG. 2A illustrated circuits.
FIG. 2C is an abbreviated circuit diagram of an associative store using the present invention and performing the logic functions performed in the FIG. 2A illustrated circuit.
FIG. 2D is a legend illustrating the partitioned functions of the FIG. 2C illustrated circuit.

Referring now more particularly to FIG. 1, an associative store includes search array 10 and read array 11 constructed in accordance with U.S. Pat. No. 3,593,317 with circuits as illustrated in FIGS. 2A and 2C. Search array 10 has a plurality of columnar input lines (FIGS. 2A, 2C), respectively, receiving binary input signals over cable 12 and encoded signals over cable 13 from encoder 14 as well as feedback signals over cables 15 and 16. Encoder 14 receives binary input signals plus feedback signals from output register 17 and over line 18 from read array 11. Line 18 provides immediate feedback. Encoder 14 and array 10 partition the binary input signals among themselves, the feedback signals among themselves and cross-field partitions the binary input signals with the feedback signals in accordance with the teachings of the present invention.

Search array 10 has a set of row output lines represented by cable 20 respectively connected to a corresponding set of row input lines represented by the end of the cable 20 at 21 to supply search result signals to read array 11. Read array 11 has a set of columnar output lines represented by cable 22. Cable 22 or columnar output lines are connected to register 17 for providing timed feedback to search array 10 as well as over cable 16 for immediate feedback and over cable 23 as binary output signals.

In FIG. 1, the cross-field partitioning by encoder 14 between the binary input signals and feedback signals reduces the size of search array 10 for a given function being performed as will be more clearly pointed out, particularly between FIGS. 2A and 2C, and between FIGS. 4 and 5.

Before proceeeding with description of the preferred implementation of the invention, the abbreviated nomenclature used to explain the invention is set forth below.

| Binary Signal Field | | Logic Function |
|---|---|---|
| A | B | |
| P | P | A + B |
| P | N | $A + \bar{B}$ |
| N | P | $\bar{A} + B$ |
| N | N | $\bar{A} + \bar{B}$ |
| U | U | A γ B (A ≠ B) |
| E | E | A = B |

The letters P, N, U, E represent partitioned relationships between two inputs of a search array 10 to achieve the logic functions on the same line. The present invention enhances operation by partitioning between an external input signal and a feed-back signal. To more clearly understand the invention, partitioning, per se, is first described.

Referring next to FIG. 2A, an abbreviated circuit diagram illustrates the operation of the fundamental portions of the search and read arrays of FIG. 1. For simplicity purposes, only two inputs are provided, an A and B, both inputs entering search array 10 in true-complement form. It being understood when the line A has an active signal, line $\bar{A}$ has an inactive signal, vice versa, and the same for input B. Partitioning is not implemented in FIG. 2A. The columnar input lines 12 extend the vertical distance of array 10, with the ellipsis indicating omitted logic circuits and row output lines 20 as well as omitted columnar input lines. FET (field effect transistors) selectively connect a columnar input line to a given row output line. For example, FET 26 electrically connects the $\bar{A}$ to the row output line 27; that is, whenever $\bar{A}$ has an active signal, FET 26 conducts to ground causing a relatively negative voltage to appear on line 27 which is transmitted to read array 11 for use as will be later described. Row output line 27 is not at all connected to the B input line in that the control electrodes of FET's 32, 33 have been deleted (by using known semiconductor personalizing techniques) from search array 10. In associative store terminology, FET's 32, 33 represent a "don't care" situation; that is, the signal line 27 is independent of input signal B. In a similar manner, FET's 29 and 30, respectively, connect lines A and $\bar{B}$ to row output line 31.

The logic of array 10 as illustrated in FIG. 2A is that a relatively high potential on line 27 represents A while a similar relatively high reference potential on line 31 represents $\bar{A}$ and B. FET's 29, 30 represent an AND function in the same manner that AND circuits are shown in U.S. Pat. No. 3,593,317. The above described logic functions are represented in an abbreviated tabular form in FIG. 2B by binary 1's, 0's and blanks. The "1" represents a logic connection to a true input, such as A; the 0 a logic connection to a complement input, such as $\bar{A}$ and a blank is no connection, such as a FET 32.

To achieve the above mentioned logic connections, a so-called negative electrical connections are used. That is, a logical 1 is transferred by actually transferring an electrical signal representing a binary 0, and later combined in a manner to provide a binary 1 logic effect. In FIG. 2A, a logical B is transferred through array 10 by FET 47 — i.e., $\bar{B}$ signal is transferred. Because of the logical conversion afforded by the FET 47 connections to FET 48 in read array 11, the logical effect at 37 is that B is active. The reverse is also true.

Turning now to read array 11, columnar output lines 22 produce output signals C and D. As shown in FIG. 2A, output signal C is active whenever FET 26 is not conductive; i.e., row output line 27. This carries a relatively positive potential to actuate FET 35 to current conducting causing columnar output line 36 to reach ground reference potential. Ground reference potential is inverted by amplifier 37 to provide a positive output signal at terminal C. Another way to generate C is to make FET 47 nonconductive ($\bar{B} = 0$) such that FET 48A in read array 11 electrically grounds columnar output line 36. There is an "OR" relationship provided between the FET 38 and FET 48A. In a similar manner, columnar output line 38 is activated only when row output line 31 OR 34 from array 10 has a relatively positive signal thereon; i.e., both FET's 29 and 30 are electrically nonconductive OR both FET's 80, 81 are nonconductive. In such a situation, FET either 48A or 39 conducts supplying ground reference potential to columnar output line 38 resulting in an active output signal at D.

Referring next to FIG. 2B, the abbreviated representation of the FIG. 2A, illustrated circuits, is shown in FIG. 2B. In the first or upper most row, at 40, the active signal A supplied from search array 10 to read array 11 is represented by the 1 in column 41. This active signal is generated in array 10 as indicated by the 1 in the A column, corresponding to FET 26 of FIG. 2B. In a similar manner, the 1 in B column at row 49 corresponds to FET 47 while the 1 in column 41 at row 49 corresponds to FET 48A. Hence, output C is the NAND function of $\bar{A}$ and $\bar{B}$ or the OR function A+B. If C is defined active when relatively high at output inverting amplifier 37, then the OR function A+B is performed in the two array words 40, 49. When C is defined active if relatively low, then the AND function $\overline{AB}$ is performed.

In a similar manner, row 42 has a connection in columnar input line A to the row output line in read array 11. The 0 in B column at row 42 represents a $\bar{B}$ logic connection such as by FET 80 of FIG. 2A. Because of the above-mentioned negative logic, a B physical connection is a $\bar{B}$ logical connection. Accordingly, the 1 43 in row 42 representing FET 48 of FIG. 2A in combination with search array 10 line 34 action yields AND function $A\bar{B}$. Additionally, a second connection as at 44 in row 45 connects the search array to columnar output line D to logically OR combine the search array 10 function $\bar{A}B$ with $A\bar{B}$ to yield an EXCLUSIVE OR function from words 42, 45.

The reduction in circuitry by practicing the present invention is demonstrated by comparing FIGS. 2A and 2C, FIG. 2A being a prior art solution using four words and FIG. 2C being the inventive solution using two words to achieve the same logic functions between input and feedback digital signals. As the functions in the arrays 10, 11 are extended the added encoding logic replaces more and more array words to achieve substantial circuit reductions as seen by comparing FIGS. 4 and 5.

Referring next to FIG. 2C, a cross-field partitioning circuit element PN is shown in logic diagram form. Two binary input signals, A and B, (one of which is preferably a feedback signal in accordance with the invention) are partitioned into four signals AB, $\bar{A}B$, $\overline{AB}$ and $A\bar{B}$ by the illustrated inverters 50, 51 and AND's 52, 53, 54 and 55, connected as shown. The only additional circuits required for partitioning over the FIG. 2A illustrated prior art are the four AND circuits. The partitioning action is completed in search array 10. For row output line 20B to have an active output signal (relatively high or positive), FET 58 must be current nonconductive, this means AND 55 must be outputting an inactive (relatively negative) signal. As such, the line 20B active signal then represents A+B. (C output) Hence, one word on line 20B plus one AND circuit 55 replaces two words in FIG. 2C. Referring to FIG. 2D, the partitioned function just described is indicated by the letters P; such arrangement indicates a logical OR function.

An EXCLUSIVE OR function is also performed by one word including FET's 56, 57 plus two AND's 52 and 55 (AND 55 is shown with the logical OR function.) This circuitry replaces two uniquely used words in the FIG. 2A illustrated prior art method; i.e., the two words including FET's 29, 30 and 80, 81. Such partitioned EXCLUSIVE OR function is represented in FIG. 2D by the U's. The 1 in the read array 11 remains the same in all instances.

In accordance with the invention such partitioning functions are further enhanced by partitioning between internal and external array 10 inputs, or will be later described with respect to FIGS. 4 and 5. Before proceeding, it is shown that with partitioned logic, the prior art logic functions can be performed as described with reference to FIG. 3.

In search array 10 supplies an active output in a row output line 20A only if both FET's 56A and 57A are current nonconductive. This output represents an A input. Analysis of this partitioning already shows the negative logic. In a similar manner, $\overline{AB}$ input to FET 58A yields a "A+B" output. Other combinations can be ascertained from inspection of the figure. The partitioning circuit of FIGS. 2C and 3 are shown in the subsequent figures as partitioning circuits P0 through PX, where X is an integer representing the maximum numbers of partitioning circuits for a given search array.

Referring next to FIGS. 4 and 5, a complex logic function is constructed using the principles of the present invention as shown in FIG. 4 and a prior art technique as shown in FIG. 5. Note that the number of words required to perform all of the functions using the present invention is 12 while the number of words in the prior art apparatus is 19. In the illustration, digit position 0 is the most significant digit position of a 3-bit Gray code counter. Inputs at A and delivered through partitioning circuits P0, P1, P2 (constructed as shown in FIG. 3), preset the counter. If the preset value is 001, then P2 receives a 1 signal from A, while P0 and P1 receive 0 signals. The previous content of the counter is contained in register B and supplied respectively to circuits P0, P1, P2 from stages 0, 1 and 2. The partitioning fields are represented by single vertical lines in the search array 60: the boundary between search array 60 and read array 61 is shown by the double vertical lines. The output of partitioning circuit P2, for example, provides an activating input to word number 3 whenever the EXCLUSIVE OR function U is satisfied as between the inputs A2 and B2. Before read array 61 receives an input over the output line of word 3, the content register stage B3 must have been 0. Such as the case, stage B2 is toggled (complemented) as indicated by the letter T in read array 61 at word 3 position. In a similar manner, EXCLUSIVE OR output P1 at word 2 and B4 being a 0, toggles stage B1. A similar manner the EXCLUSIVE OR output of partitioning circuit P0 at word 1 is combined with equality between stages B3 and B4 to toggle B0. The sequence will vary in accordance with the A inputs.

The same functions are performed in the prior art FIG. 5 illustration by words 1 through 6 of search array 62 and corresponding read array 63. Examination of the figure will illustrate that the functions performed are identical. The letters S and R in the read array respectively signify set and reset signal connections for the external register. Note that partitioning circuit P partitions two stages of the feedback register 64. Cross-field partitioning has reduced the number of words from 6 to 3 for the above described functions. Based upon examination of known search array constructions, the number of circuits added in the cross-field partitioning is small with respect to the number of circuits in the eliminated three words.

The next field in words 4 through 9 of FIG. 4 and 7 through 13 of FIG. 5 illustrates set and reset functions based upon an arbitrary input combination including cooperation with the register B being fed back as shown in the figures. The set-reset function requires two words one for set and other for reset. For example, stage 70 is set by the output of word 9 of FIG. 4 and reset upon the output of word 10 of FIG. 4, the same function is accomplished by one word 6 as shown in FIG. 5 when partitioning is used.

Further advantages of the invention is further illustrated by examining words 10 through 12 of FIG. 4 and words 14 through 19 of prior art FIG. 5, a reduction of three array words. Again, the EXCLUSIVE OR functions of the cross-field partitioning circuits illustrate that cross-field partitioning can greatly reduce total hardware complexities. For example, in word 10, the EXCLUSIVE OR output of P0 is combined (AND-ed) with the EXCLUSIVE OR output of P3 (feedback partitioning) to set register stage 71. In a similar manner, words 14 and 15 are both required to set register position 71' of FIG. 5. Hence it is seen that cross-field partitioning avoids the requirement of duplicating word functions by selectively combining inputs and partitioning same for improving the number of functions performed per search field word. Cross-field partitioned words 11 and 12 are similarly compared with words 16, 17 and 18, 19 of FIG. 5.

In summary, the cross-field partitioning shown in FIG. 4 provides good economic advantage over the hardware requirements of the FIG. 5 prior art function table.

FIG. 6 is an additional table using the present invention of cross-field partitioning. FIG. 6 illustrates that the cross-field partitioning can be advantageously combined with other functions in an arbitrary manner such as shown in FIG. 1 of the present application for achieving maximum function from a given function table or functional memory.

Words 1 through 4 are a parity checker based on inputs A and utilizing cross-field partitioning circuits P1 and P2. In word 1, the 4 data bits from A are paired, the bits in each pair are equal to the parity bit is 0. Even parity is indicated in column P; i.e., the number of 1's in quantity A is even. In a similar manner, in word 2, the EXCLUSIVE OR outputs of the two partitioned input fields, the two U's in each field indicate binary input signals to the respective fields must be unequal; i.e., in P1 the two binary signals are unalike and in P2 its two binary signals are unalike. With an 0 inputs to word 5, even parity is indicated in column P. Parity is checked in words 3 and 4 by combining quality signals (E) with EXCLUSIVE-OR (U) signals, as shown.

In field of words 5 through 14, a counter with the parity on the counter is provided. Counter K is stepped in a Gray code fashion with odd and even parity being generated in parity register 75. Words 5 through 10 generate parity as described for words 1 through 4 with the two output stages, respectively, for even and odd parities. The content of counter K is transmitted through the K-out register 77.

The FIG. 6 illustrated functional array also provides a series adder in words 15 through 34. These words perform the series add via register 78 with the sum output being supplied through sum register 79. Input control words 15 through 18 operated upon by partitioning circuits P3 through P6 to form the EXCLUSIVE OR combination of input B with the content of register 78. The EXCLUSIVE OR difference causes the toggle outputs of the illustrated read array to toggle the corresponding digit positions of register 78. This action inserts input B into register 78. Words 19 through 34 add the present contents of register 78 to the signal content of input signal B. Examination of a search array table shows the summing functions necessary for a 4-bit parallel adder. The effect of the adder is to add adjacent values in a string of values. For example, take a series of 4-bit quantities B1, B2, B3 . . . The first sum through sum register 79 is a total of B1 plus B2, the second sum is a total of B2 plus B3, the third, B3 plus B4, etc.

While the invention has been particularly shown and described with reference to preferred embodiments thereof, it will be understood by those skilled in the art that various changes in form and details may be made therein without departing from the spirit and scope of the invention.

What is claimed is:

1. An array digital signal processor having an array of logic elements with a plurality of columnar input lines logically associatable by predetermined electrical connections in array form with a plurality of columnar output lines, said electrical connections each including electrical switching elements, the improvement including in combination:

an encoder circuit having a plurality of output connections to predetermined ones of said columnar input lines and having first and second input portions, said encoder circuit supplying output signals at said output connections dependent upon both said input portions, input means for receiving a plurality of binary signals and means for supplying one of said binary signals to said first input portion, and means connecting at least one of said columnar output lines to said second input portion.

2. The digital signal processor set forth in claim 1 wherein said array of logic elements has first and second array portions, said first array portion being a rectangular array of logic AND circuits with a plurality of row output lines, said logic AND circuits connecting said columnar input lines to said row output lines in a predetermined array logical AND relationship, said second array being a rectangular array of logic OR circuits and having a plurality of row input lines respectively connected to said row output lines for logically OR connecting said row input lines to said columnar output lines in accordance with a predetermined array logical OR relationship, and said plurality of encoder output connections being in accordance with a predetermined ordered combinational relationship of said input portions such that coaction of said encoder circuit and said first array portion combine signals from said input portions in a negative logic manner within said first array portion.

3. The digital signal processor set forth in claim 1 wherein said connecting means further includes a storage register, and said storage register having input connections to a predetermined ones of said columnar output lines and having an output connection to said second input portion.

4. The digital signal processor set forth in claim 1 further including a plurality of said encoder circuits having output connections to predetermined ones of said columnar input lines and each said encoder circuit having said first and second input portions respectively connected to said input means and respectively to predetermined ones of said columnar output lines.

5. The digital signal processor set forth in claim 4 wherein said connection means includes a register having a plurality of storage stages, predetermined ones of said storage stages having respective connections to said encoder circuits and to said columnar output lines, and other ones of said storage stages connected to certain ones of said columnar input lines.

6. An array digital signal processing circuit having a search array of logic AND elements and a read array of logic OR elements, said search array having a plurality of columnar input lines electrically connected to a plurality of row output lines in a predetermined pattern of electrical connections by said logic AND circuits, said read array having row input lines respectively connected to said row output lines and electrically connected to a plurality of columnar output lines in a predetermined pattern of logic OR circuits, the improvement including in combination:

a binary to one-of-N (N is a positive integer) encoder for receiving binary signals and supplying an encoded one-of-N signal, separate output means for each of said one-of-N signals, said output means being respectively connected to predetermined ones of said columnar input lines, input means supplying certain binary signals to said encoder, and feedback means receiving binary signals from predetermined ones of said columnar output lines and supplying at least one binary signal to said encoder whereby signals from said read array are partitioned with said input signals.

* * * * *